(12) United States Patent
Enevoldsen et al.

(10) Patent No.: US 11,795,910 B2
(45) Date of Patent: Oct. 24, 2023

(54) ADAPTABLE SPOILER FOR A WIND TURBINE BLADE

(71) Applicant: Siemens Gamesa Renewable Energy A/S, Brande (DK)

(72) Inventors: Peder Bay Enevoldsen, Vejle (DK); Moritz Fiedel, Hamburg (DE); Florian Girschig, Skørping (DK); Alejandro Gomez Gonzalez, Aarhus (DK); Sune Niemann Jensen, Aarhus (DK)

(73) Assignee: SIEMENS GAMESA RENEWABLE ENERGY A/S

(*) Notice: Subject to any disclaimer, the term of this patent is extended or adjusted under 35 U.S.C. 154(b) by 32 days.

(21) Appl. No.: 17/311,702

(22) PCT Filed: Nov. 7, 2019

(86) PCT No.: PCT/EP2019/080504
§ 371 (c)(1),
(2) Date: Jun. 8, 2021

(87) PCT Pub. No.: WO2020/120037
PCT Pub. Date: Jun. 18, 2020

(65) Prior Publication Data
US 2022/0025855 A1    Jan. 27, 2022

(30) Foreign Application Priority Data
Dec. 13, 2018  (EP) .................................. 18212383

(51) Int. Cl.
*F03D 7/02*        (2006.01)
*F03D 1/06*        (2006.01)

(52) U.S. Cl.
CPC ......... *F03D 7/0232* (2013.01); *F03D 1/0633* (2013.01); *F05B 2240/3052* (2020.08); *F05B 2240/3062* (2020.08)

(58) Field of Classification Search
None
See application file for complete search history.

(56) References Cited

U.S. PATENT DOCUMENTS 2,400,388 A * 5/1946 Campbell ............ B64D 27/023
                                                244/113
3,136,501 A * 6/1964 Barber ...................... B64C 3/46
                                                244/3.22

(Continued)

FOREIGN PATENT DOCUMENTS

EP    1 623 111 B1    9/2008
EP    1 995 455 A1    11/2008

(Continued)

OTHER PUBLICATIONS

European Search Report and Written Opinion of the European Searching Authority dated Jun. 19, 2019 for Application No. 18212383.6.

(Continued)

*Primary Examiner* — Kayla Mccaffrey
(74) *Attorney, Agent, or Firm* — Schmeiser, Olsen & Watts LLP

(57) ABSTRACT

Provided is an adaptable spoiler for a wind turbine blade, including: a flexible body including: an outer surface to be exposed to air flow; an internal surface limiting a cavity to be inflated with fluid to different level, wherein a shape and/or position and/or orientation of the surface to be exposed to air flow changes upon inflating the cavity to different level.

10 Claims, 3 Drawing Sheets

(56) References Cited

U.S. PATENT DOCUMENTS

| | | | |
|---|---|---|---|
| 3,586,267 A * | 6/1971 | Ingelman-Sundberg | ................... B64C 9/32 244/203 |
| 5,106,265 A | 4/1992 | Holzem | |
| 5,326,050 A | 7/1994 | Zell | |
| 8,251,656 B2 * | 8/2012 | Stiesdal | ................ F03D 7/0232 416/228 |
| 8,851,840 B2 | 10/2014 | Hancock et al. | |
| 9,033,661 B2 * | 5/2015 | Pesetsky | ............... F03D 1/0633 416/23 |
| 10,677,217 B2 * | 6/2020 | Herrig | ..................... F03D 7/022 |
| 10,968,887 B2 * | 4/2021 | Akay | ..................... F03D 1/0675 |
| 2003/0091436 A1 | 5/2003 | Stiesdal | |
| 2010/0018322 A1 * | 1/2010 | Neitzke | ..................... B64C 3/38 73/861.22 |
| 2011/0110777 A1 | 5/2011 | Abdallah et al. | |
| 2012/0141271 A1 * | 6/2012 | Southwick | ............ F03D 7/0232 416/1 |
| 2018/0010579 A1 | 1/2018 | Akay et al. | |
| 2018/0058424 A1 * | 3/2018 | Egedal | .................. F03D 7/0224 |

FOREIGN PATENT DOCUMENTS

| | | |
|---|---|---|
| EP | 2 514 962 A1 | 10/2012 |
| EP | 2664791 A2 | 11/2013 |
| EP | 3 128 169 A1 | 2/2017 |
| WO | 2018/041420 A1 | 3/2018 |
| WO | 2018/162102 A1 | 9/2018 |

OTHER PUBLICATIONS

International Search Report and Written Opinion for PCT/EP2019/080504 dated Feb. 27, 2020.

* cited by examiner

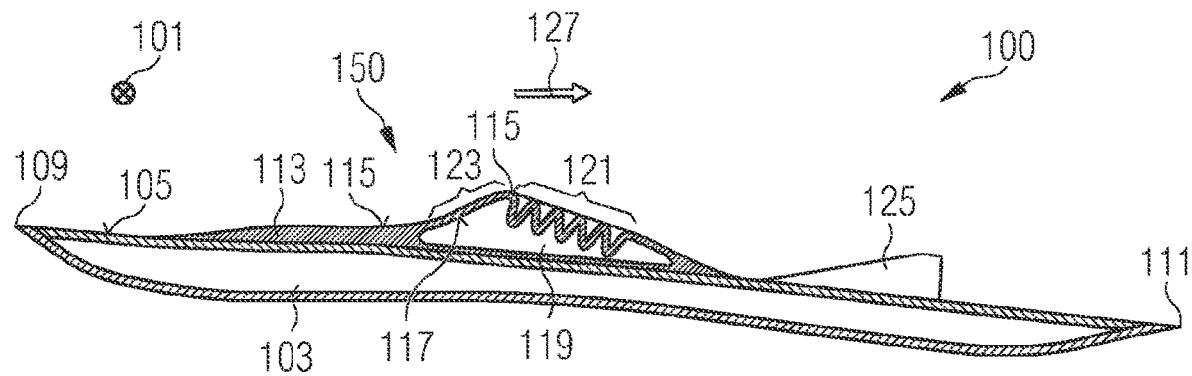
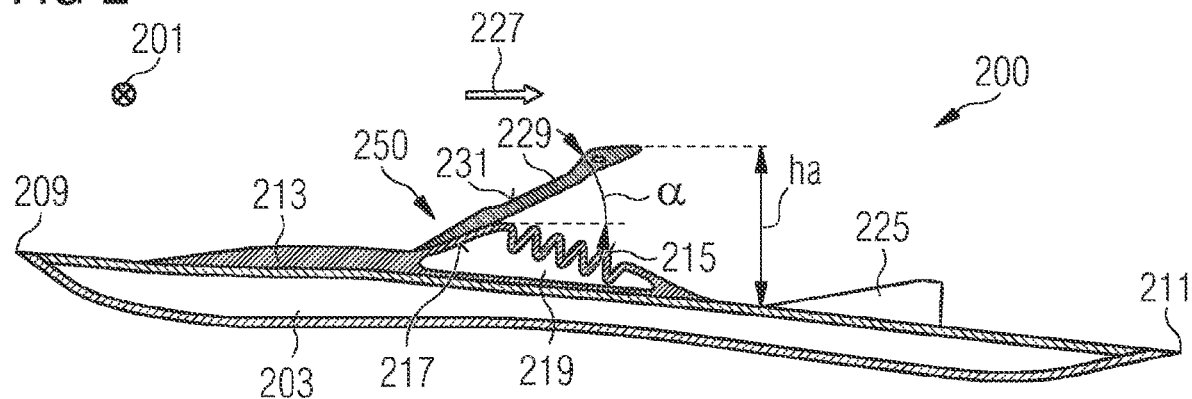
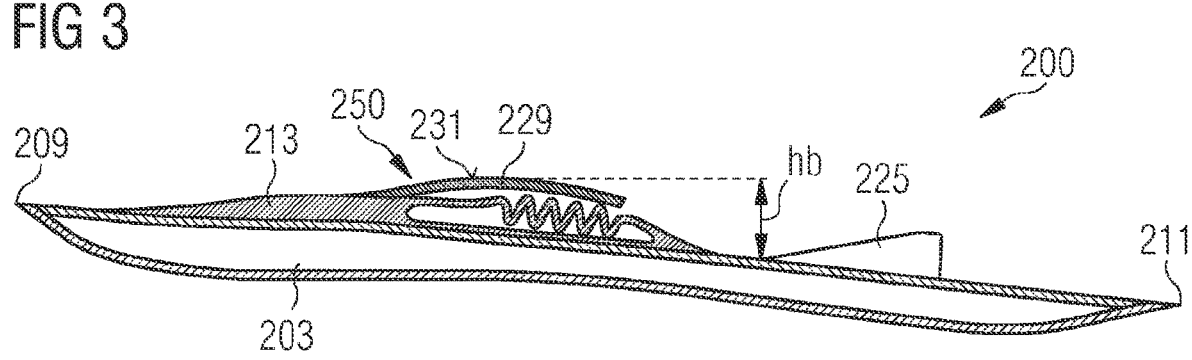

ADAPTABLE SPOILER FOR A WIND TURBINE BLADE

CROSS-REFERENCE TO RELATED APPLICATIONS

This application claims priority to PCT Application No. PCT/EP2019/080504, having a filing date of Nov. 7, 2019, which is based on EP Application No. 18212383.6, having a filing date of Dec. 13, 2018, the entire contents both of which are hereby incorporated by reference.

FIELD OF TECHNOLOGY

The following relates to an adaptable spoiler for a wind turbine blade and further relates to a rotor blade for a wind turbine.

BACKGROUND

A wind turbine rotor blade may have installed a flow regulating device on its surface. An example of such a flow regulating device is a vortex generator (VG). The rotor blade may further comprise a spoiler installed at the rotor blade surface. The spoiler may act in concert with the vortex generator and may influence the effect of the vortex generator depending on the state of the spoiler. The state of the spoiler may relate to a protrusion height and/or tilt angle by which the spoiler extends from or is tilted relative to other surface portions of the rotor blade. The spoiler can be used to actively suppress the function of the flow regulating device, or fully bypass the flow regulating device and cause local aerodynamic stall of the airfoil. In general, a flow regulating device may be considered to comprise a device which is capable of, for example, enhancing the lift coefficient of the airfoil section, for example by increasing the level of energy of the boundary layer of the rotor blade.

EP 1 623 111 B1 discloses a wind turbine blade including adjustable lift-regulating means arranged on or at the surface of the wind turbine blade and extending in the longitudinal direction of the blade and an activation means by which the lift-regulating means can be adjusted and thus alter the aerodynamic properties of the blade. The lift-regulating means comprise one or more flexible flaps.

U.S. Pat. No. 8,851,840 B2 discloses a wind turbine blade comprising a blade body and a device for modifying the aerodynamic surface or shape of the blade, wherein a pneumatic actuator controls the position and/or movement of the device, wherein a pressure chamber positioned within the blade body is present. The pressure chamber may be pressurized thereby changing the state of the device, thereby modifying the aerodynamic surface or shape of the blade.

U.S. Pat. No. 5,106,265 A discloses a wind turbine blade comprising a pneumatically actuated spoiler movable perpendicular to an airstream.

WO 2018/041420 disclose a rotor blade comprising an aerodynamic device for influencing the air flow flowing from the leading-edge section of the rotor blade to the trailing edge section of the rotor blade, wherein the aerodynamic device is mounted at a surface of the rotor blade and comprises a pneumatic or hydraulic actuator, such as a hose or a cavity of which the volume depends on the pressure of the fluid being present inside the pneumatic or hydraulic actuator.

It has been observed that an adaptable spoiler comprises a number of components, which need to be assembled during manufacturing in a cumbersome manner. Thus, there may be a need for an adaptable spoiler for a wind turbine blade and for a wind turbine blade in which the adaptable spoiler has a simple construction, good reliability, less components, and a configuration and can be manufactured in a simple manner, for example by extrusion.

SUMMARY

An aspect relates to an adaptable spoiler for a wind turbine blade, comprising: a flexible body comprising: an outer surface to be exposed to air flow; an internal surface limiting (in particular enclosing) a cavity to be inflated with fluid to different levels (e.g., for adapting the spoiler to different aerodynamic (e.g. air flow influencing) properties), wherein a shape of the surface to be exposed to air flow changes upon inflating the cavity to different levels.

The flexible body may be made from a homogeneous material which can be deformed, thereby adapting different outer shapes. The body may be deformable and/or elastic. The body may be configured to extend essentially along a whole longitudinal length of a wind turbine rotor blade. The outer surface of the flexible body may be a surface of the body which is (at least partly) subjected to an air flow during normal operation of the spoiler, i.e. when installed at a wind turbine blade while the wind turbine blade moves due to impact of wind.

The wind turbine blade may be connected to a rotor of the wind turbine which may partly be harboured within a nacelle, and which may drive a generator also arranged within the nacelle.

The air flow may relate to the air flow occurring during normal operation of the operating wind turbine when the impacting wind flows close to or at the wind turbine blade and at the outer surface of the spoiler, in particular from a front edge of the rotor blade to a trailing edge of the rotor blade. Thus, the air flow may substantially flow in a direction substantially perpendicular to the longitudinal direction of the rotor blade corresponding to the longitudinal direction of the adaptable spoiler.

The spoiler may be installable along the entire length of the rotor blade or along a portion of the length of a rotor blade. The spoiler may be configured as a continuous spoiler or a segmented spoiler, wherein several spoiler segments are installable along the longitudinal direction of the rotor blade.

Not only the outer surface of the body may be exposed to air flow during normal operation, but further other surface portions of the spoiler may be exposed to the air flow, one or more of the surface portions may e.g. be attached at the outer surface of the body. Also, these other components or portions of the spoiler may change position and/or orientation upon inflating the cavity to different level or degree. Some or more of the other components attached to the body may for example comprise stiff elements.

Advantageously, the cavity is integrally formed in the flexible body. When the body is flexible, the shape of the surface to be exposed to air can change (for example regarding protrusion height and/or tilt angle and/or shape) without requiring any hinges, for example connecting stiff elements rotatable relative to each other, as has been utilized in conventional adaptable spoilers. Thereby, the construction may be simplified, the number of pieces reduced, the reliability increased, and allowing for more simple manufacturing processes. The body may for example be extruded in a conventional extrusion process. Thereby, a simple adaptable spoiler, which can be manufactured in a simple manner, is provided.

The fluid may comprise a gas or a liquid, in particular an inert gas, air, or dry air.

When the internal surface is limiting the cavity, the internal surface may partly or completely enclose or surround the cavity. According to other embodiments the internal surface may additionally be limited by elements different from the internal surface.

According to an embodiment of the present invention, the outer surface to be exposed to air flow is at least in part airfoil shaped. Thus, the outer surface may have a particular surface profile, which has been designed to selectively and directionally influence an air flow close to or at or across the adaptable spoiler. Thereby, the air flow may be changed to allow sophisticated controlling the wind turbine operation.

For example, the adaptable spoiler may act in concert with another flow-regulating device, which may be installed (in the flow direction) downstream of the adaptation spoiler. Depending on the state of the adaptable spoiler, the aerodynamic effect of the downstream installed flow-regulating device may be altered. For example, a vortex generator may thereby be set, depending on the state of the adaptable spoiler, to a high or a low (or even vanishing) efficiency of vortex generation, or the flow behind the spoiler may be forced to completely separate from the surface of the airfoil.

According to an embodiment of the present invention, the spoiler further comprises at least one stiff element, in particular segmented along a longitudinal direction, distinct from the body and having a surface to be air flow exposed, wherein the stiff element is attached to the body such that a protrusion height and/or tilt angle of the surface of the stiff element changes upon inflating the cavity to different level or degree.

The stiff element may have a stiffness greater than the stiffness of the flexible body. The stiff element may in particular be rigid, thus substantially not flexible. The stiff element attached or formed at the body may partly be attached or formed at the outer surface to be exposed to air flow of the flexible body. The stiff element may supplement the influence as caused by the outer surface of the flexible body, in order to more efficiently influence the air flow. Even though the flexible body may be continuous and in particular extending across substantially an entire length of the rotor blade, the stiff element may be segmented into several segments arranged along the longitudinal direction of the spoiler.

When the stiff element is segmented in pieces, transfer of strain from the blade into the stiff elements may be reduced or even avoided. Further, easier installation may be enabled.

According to an embodiment of the present invention, the stiff element has an airfoil shape or plane shape. Thereby, the air flow may effectively be influenced, when the air impacts on the surface to be air flow exposed of the stiff element.

According to an embodiment of the present invention, the spoiler comprises a stiff connection structure adapted to be connected at a rotor blade surface, wherein the body is coupled to the connection structure.

The stiff connection structure may for example be connected at the rotor blade surface in a region or close to a front edge or leading edge of the rotor blade, or at a location between the leading edge and the trailing edge of the airfoil section. The body may be arranged downstream the stiff connection structure. The stiff connection structure may also comprise a surface to be exposed to the air flow, which has a particular shape or profile designed for a desired effect on the air flow. The stiff connection structure may not partici-pate in the adaptation of the spoiler. The stiff connection structure may allow a rigid and secure mounting the spoiler at the rotor blade.

According to an embodiment of the present invention, the connection structure comprises an upper engagement portion and a lower engagement portion, in particular forming a slit in between, the body comprising an engageable portion configured to be engaged by the upper and lower engagement portions of the connection structure, in particular by inserting into the slit and latching within the slit by at least one notch mating with at least one protruding element.

The connection between the stiff connection structure and the body may be achieved without using any metal pieces, in particular not using any bolts. The connection structure may be a continuous structure or may be segmented and may be arranged along the longitudinal direction. The engageable portion of the body may be slid into the slit formed by the upper engagement portion and the lower engagement portion of the connection structure in order to assemble the spoiler. Upon sliding the engageable portion of the body into the slit, the engageable portion may catch or latch therein in a defined and fixed configuration. Either the engageable portion of the body or the upper engagement portion and/or the lower engagement portion may comprise a notch and/or a protruding element, which may have complementary shape, thereby allowing latching. Furthermore, additional securing may be provided, for example in the form of a thin adhesive layer between the engageable portion of the body and the connection structure. The engageable portion of the body may be arranged upstream the outer surface of the body to be exposed to air flow and also upstream of the internal surface partly or completely enclosing the cavity. The engageable portion may not be part of the body forming the outer surface to be exposed to air flow. Thereby, a simple assembly of the connection structure and the body may be enabled. Furthermore, a rigid mounting at or to the rotor blade is enabled using the stiff connection structure.

According to an embodiment of the present invention, the outer surface and the internal surface of the body are arranged in an air flow direction downstream the engageable portion.

Thereby, the engageable portion does not interfere with the function of the outer surface and the internal surface, in particular does not need to interfere when the cavity is inflated or deflated to a different degree. Furthermore, the shape of the outer surface of the body need not be influenced by the presence of the engageable portion of the body.

According to an embodiment of the present invention, the body further comprises a further internal surface limiting a further cavity to be inflated with fluid to different level for further adapting the spoiler to different aerodynamic properties.

The cavity and the further cavity may be inflated or deflated independently from each other, allowing sophisticated adaptation of the spoiler, in particular sophisticated adaptation of the outer surface shape being exposed to the air flow. Thereby, the degree of freedom to which the air flow can be influenced may be extended. Also inflating the further cavity to a different degree may change the shape of the surface to be exposed (of the body). The degree of inflation or deflation of both, the cavity and the further cavity, may contribute to the definition of the shape of the outer surface of the body exposed to air flow or may participate in the definition of the orientation and positioning of one or more further components or elements coupled to the outer surface and supplementary defining the active spoiler surface which is exposed to the air flow.

According to an embodiment of the present invention, the further internal surface is arranged within the body in a flow direction downstream the internal surface. In particular, the further cavity may allow adapting or influencing the shape of the outer surface of the flexible body which is downstream a portion of the outer surface of the body which is mainly or primarily influenced or defined by the degree of inflation or deflation of the cavity.

According to an embodiment of the present invention, the spoiler further comprises a vortex generator formed at the body to be exposed to air flow, wherein upon inflating the cavity and/or the further cavity to different degree, the aerodynamic properties of the vortex generator change.

A vortex generator may generate vortices downstream the attachment site. Thereby, the flow in the boundary layer of the flow close to the airfoil is mixed, and the level of energy is thereby increased. This can, for example, lead to a higher maximum lift coefficient of the airfoil. In the present embodiment, the vortex generator is provided in combination with the adaptable spoiler or as a part of the adaptable spoiler, not distinct from the adaptable spoiler, as has conventionally been described. Thus, spoiler-effective portions and vortex generator-effective portions of the adaptable spoiler are provided in a single device. The vortex generator may for example be a fin-like structure protruding from the body, in particular from the outer surface or a portion of the outer surface of body. In a side-view, the vortex generator may for example have a triangular shape or at least approximately a triangular shape, where the base of the triangular shape in the flow direction is larger than the height of the triangular shape perpendicular to the surface. The vortex generator may be or may comprise several vortex generator segments, which may be provided or formed at the body spaced apart in the longitudinal direction of the spoiler. The vortex generator segments may be similar or different. For example, any shape and/or protrusion height or width of the vortex generator segments may vary with different distance from a rotor blade root which is connected to the wind turbine rotor. Thereby, a combination device including spoiler properties and vortex generator properties is provided.

According to an embodiment of the present invention, the vortex generating efficiency of the vortex generator decreases as a combination of the more the upstream cavity is inflated and the less the further downstream cavity is inflated. In particular, the protrusion height and/or orientation or tilt of the vortex generator may change upon inflating or deflating the cavity and/or the further cavity to a different degree. When both, the cavity and the further cavity, are deflated, the vortex generator may substantially have a highest vortex generating efficiency. For air flows with a very thick boundary layer, both the cavity and the further cavity may be inflated simultaneously, giving the vortex generator a larger equivalent height, thereby protruding into higher layers of the air flow, and increasing efficiency within a thick boundary layer. Furthermore, the cavity and the further cavity may be inflated to different levels, in particular introducing a tilt angle of the upper flow surface relative to the rotor blade surface between 0° and 40°. The more the cavity is inflated, the more the vortex generator may be tilted in such a way that the vortex generator becomes more and more shadowed by outer surface portions of the body protruding more and more from the rotor blade surface upstream the vortex generator. In particular, the vortex generator may be arranged above a portion of the cavity and above a portion of the further cavity such that by deflating or inflating one of these cavities, the tilt angle of the vortex generator may change. When both, the cavity and also the further cavity are fully inflated, the tilt of the vortex generator may be relatively low, for example between 0° and 10° and the height of the vortex generator above the surrounding rotor blade surface may be higher than the height of the vortex generator from the surrounding rotor blade surface in the situation when both, the cavity and the further cavity, are fully deflated. Thereby, influencing the air flow may be extended.

According to an embodiment of the present invention, the body extends along a longitudinal direction of the rotor blade over an entire longitudinal extent of the spoiler, is continuous and integrally formed, in particular comprising at least one of: rubber, natural rubber, silicone, thermoplastic rubbers or thermoplastic elastomers (TPE) as for example TPV (thermoplastic vulcanizates) or TPU (thermoplastic polyurethanes) or a combination thereof.

Thereby, the body may be integrally formed as a single continuous element in a single manufacturing process, for example involving an extrusion process which is well suited for common materials such as thermoplastic elastomers (TPE).

According to an embodiment of the present invention, it is provided an adaptable spoiler further comprising: a hydraulic and/or pneumatic apparatus arranged and configured to inflate or deflate the cavity and/or the further cavity to different degree. Thereby, adaptation of the spoiler is achievable in a simple manner, as is conventionally available.

According to an embodiment of the present invention, it is provided a rotor blade for a wind turbine, comprising: a blade airfoil surface and an adaptable spoiler according to one of the preceding embodiments installed at the blade airfoil surface, in particular a front portion of a suction surface, e.g., installed in a region between 20% and 50% of the local chord length, in the chordwise direction measured from the leading edge to the trailing edge.

According to an embodiment of the present invention, the rotor blade further comprises a flow regulating device, in particular comprising at least one vortex generator, installed at the blade airfoil surface downstream the spoiler, wherein depending on a state of the adaptable spoiler, the effect of the flow regulating device on the air flow is changed.

Since the adaptable spoiler may provide influence of the air flow in an extended manner, also the downstream installed flow-regulating device may therefore be operated in an extended operation regime.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

BRIEF DESCRIPTION

Some of the embodiments will be described in detail, with reference to the following figures, wherein like designations denote like members, wherein:

FIG. 1 schematically illustrates a rotor blade for a wind turbine according to an embodiment of the present invention comprising an adaptable spoiler according to an embodiment of the present invention;

FIG. 2 schematically illustrates rotor blades for a wind turbine according to different embodiments of the present invention comprising an adaptable spoiler in an extended state according to different embodiments of the present invention;

FIG. 3 schematically illustrates rotor blades for a wind turbine according to different embodiments of the present invention comprising an adaptable spoiler in a retracted state according to different embodiments of the present invention;

FIG. 4 schematically illustrates rotor blades for a wind turbine according to another embodiment of the present invention comprising an adaptable spoiler fully extended according to another embodiment of the present invention;

FIG. 5 schematically illustrates rotor blades for a wind turbine according to another embodiment of the present invention comprising an adaptable spoiler fully retracted according to another embodiment of the present invention;

DETAILED DESCRIPTION

Figure 4:
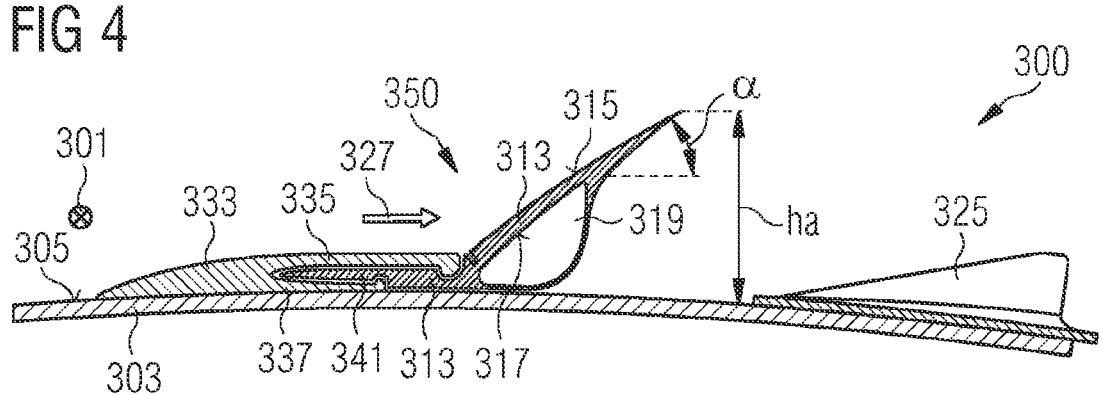

Elements depicted in FIGS. 1 to 9, similar in structure and/or function are labeled in the different figures with reference signs only different in the first digit. A description of one element not described with reference to a particular embodiment may be taken from the description of this element as provided in the description of another embodiment.

The suction side portion of the rotor blade 100 schematically illustrated in FIG. 1 in a sectional view viewing along the longitudinal direction 101 of the rotor blade 100 comprises a rotor blade body 103 having a blade airfoil surface 105 at a suction side. The rotor blade 100 has a leading edge 109 and a trailing edge 111. The rotor blade 100 further comprises an adaptable spoiler 150 according to an embodiment of the present invention which is installed at the suction side blade airfoil surface 105 of the rotor blade 100.

The adaptable spoiler 150 comprises a flexible body 113 made from a flexible, deformable and elastic material, in particular being continuous forming a single component. The flexible body 113 comprises an outer surface 115 which is to be exposed to air flow. The adaptable spoiler 150 further comprises an internal surface 117 limiting a cavity 119 to be inflated with fluid (such as air, but for example also other fluids such as inert gases) to a different degree (for example to a different pressure). The shape of the surface 115 to be exposed to air flow changes upon inflating the cavity 119 to different degree. Since the flexible body 113 is made of a flexible deformable material, the shape of the internal surface 117 of the cavity 119 will change, in particular expand when the cavity 119 is inflated. Due to the extension of the cavity 119 also the outer surface 115 will expand or in general change shape, for example regarding protrusion height and/or in general an active flow-influencing profile. In particular, the upper surface of the body 113 comprises a bellow region 121 comprising a zigzag-shaped surface portion, facilitating increasing or decreasing the area of the internal surface 117 upon changing the volume of the cavity 119 while reducing also the internal strains in the materials. At least in a region 123 of the outer surface 115, the outer surface has an airfoil shape which changes upon inflating or deflating the cavity 119.

The rotor blade 100 further comprises in a rear section of the rotor blade, a vortex generator 125 which is arranged in the air flow direction 127 downstream the adaptable spoiler 150. Depending on the state of the adaptable spoiler 150, the effect of the vortex generator 125 on the air flow 127 is changed.

FIGS. 2 and 3 schematically illustrate in a sectional view as seen when viewed along the longitudinal direction 201 of the rotor blade, a rotor blade 200 according to an embodiment of the present invention including an adaptable spoiler 250 according to an embodiment of the present invention, in two spoiler states. Namely, in FIG. 2, the spoiler 250 is in a fully extended state, where in FIG. 3 the spoiler 250 is in a fully retracted state.

The embodiment 250 of the spoiler illustrated in FIGS. 2 and 3 are similar to the spoiler 150 illustrated in FIG. 1, also comprising a flexible body 213 having an outer surface 215 and an internal surface 217 limiting a cavity 219. However, different from the embodiment illustrated in FIG. 1, the spoiler 250 illustrated in FIGS. 2 and 3, comprises at least one stiff element 229 which is distinct from the body 213 and has a surface 231 exposed to the air flow 227. The stiff element 229 is attached to the body 213 such that a protrusion height ha, hb and/or tilt angle α of the surface 231 changes upon inflating the cavity 219 to different degree. The stiff element 229 may have the form of a plate, for example plane plate or curved plate, for example having an airfoil shape. When the cavity 219 is deflated, the protrusion height decreases from the height "ha" to the height "hb" and the tilt angle α decreases substantially to zero.

Figure 5:
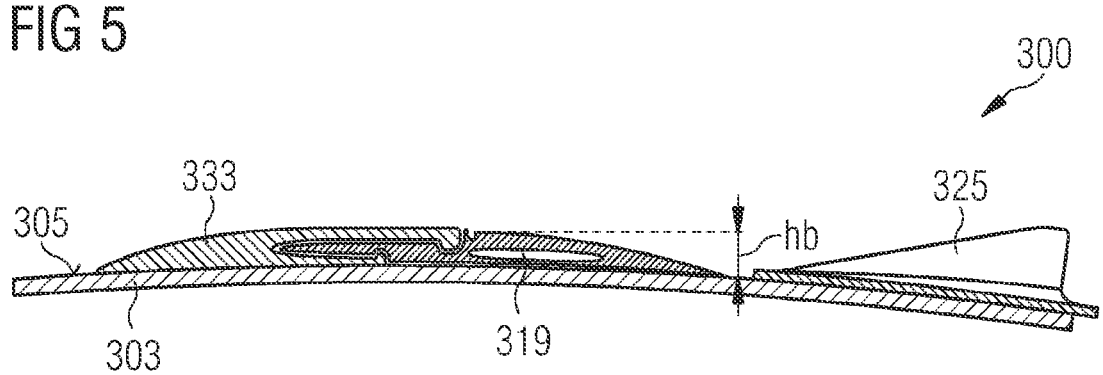
Figure 6:
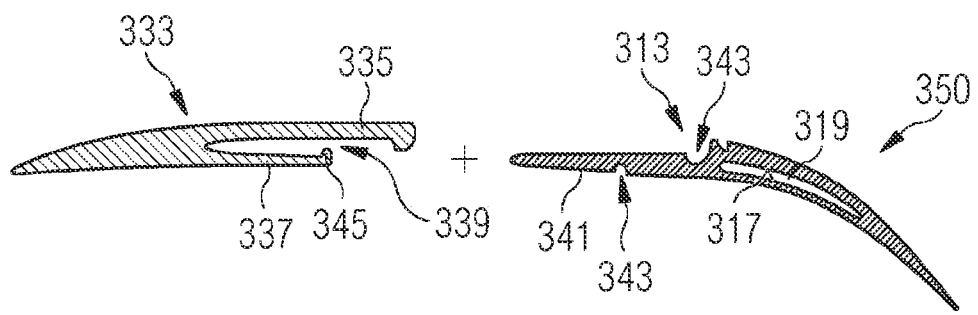
FIG. 6 represents a disassembled spoiler.

FIGS. 4 and 5 schematically illustrate in a sectional view a rotor blade 300 according to a further embodiment of the present invention comprising an adaptable spoiler 350 according to another embodiment of the present invention which is further illustrated in a sectional side view when viewed along the longitudinal direction 301 in FIG. 6 in a disassembled configuration.

The adaptable spoiler 350 comprises a stiff connection structure 333 which is adapted to be connected at a rotor blade surface 305 of the rotor blade 300 having a body 303. The body 313 of the spoiler 350 is coupled to the connection structure 333 and is therefore also mounted at the rotor blade surface 305. The connection structure 333 comprises an upper engagement portion 335 and a lower engagement portion 337 which form a slit 339 between them as can be seen in FIG. 6 illustrating the adaptable spoiler 350 when the stiff connection structure 333 and the body 313 are disassembled. The body comprises an engageable portion 341 configured to be engaged by the upper and lower engagement portions 335, 337 of the stiff connection structure 333, in particular by inserting into the slit 339 and latching within the slit by at least one notch 343 with at least protruding element 345 which may be attached at ends of the upper engagement portion and the lower engagement portion 335, 337.

FIG. 4 illustrates the fully extended state of the spoiler 350 having a protrusion height ha and a tilt angle α being between e.g. 30° and 90°. FIG. 5 illustrates the retracted state of the spoiler 350 having a protrusion height hb and a tilt angle substantially zero. As can be taken from FIGS. 4 and 5 for example, the outer surface 315 to be exposed to air flow 327 and the internal surface 317 limiting the cavity 319 is arranged in the air flow direction 327 downstream the engageable portion 341 of the body 313.

Figure 7:
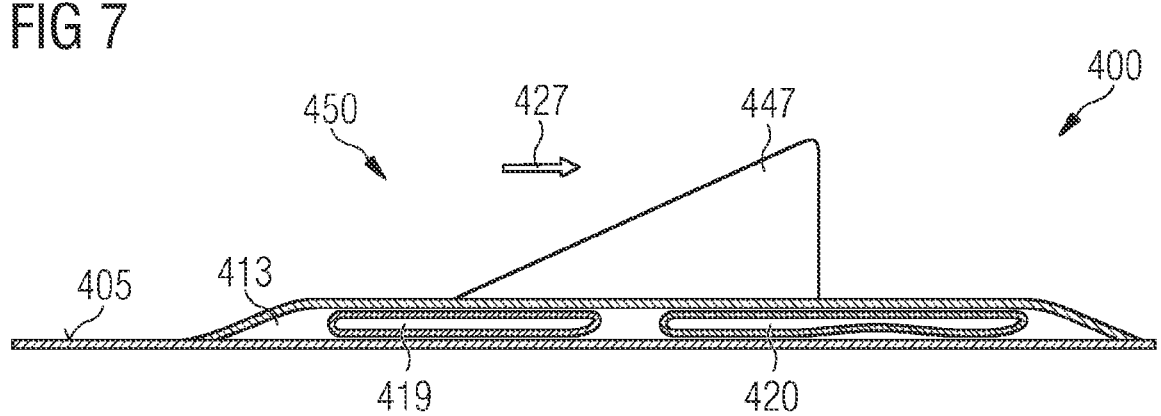
FIG. 7 illustrates a situation in which the cavity as well as the further cavity are fully deflated such that the vortex generator is entirely exposed to the air flow.
Figure 8:
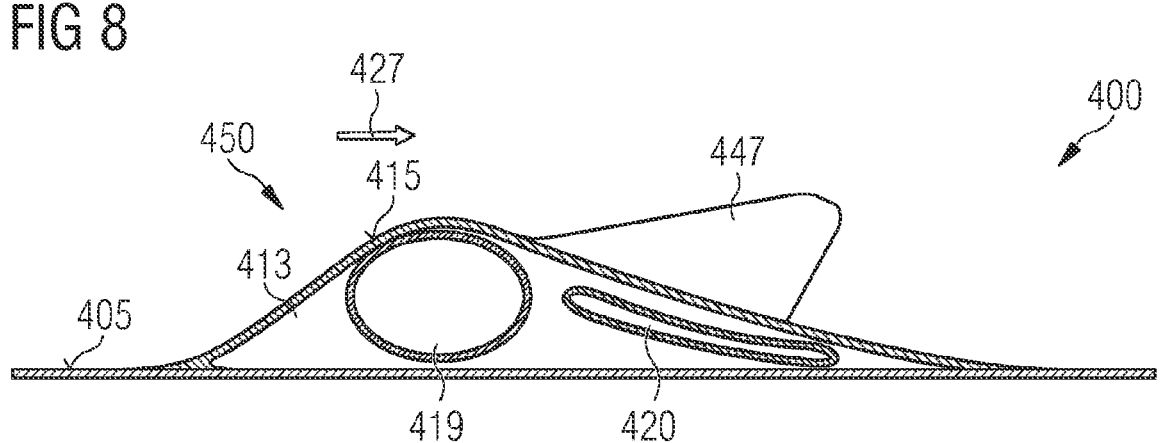
FIG. 8 illustrates the situation in which the cavity is fully inflated, while the further cavity is fully deflated.
Figure 9:
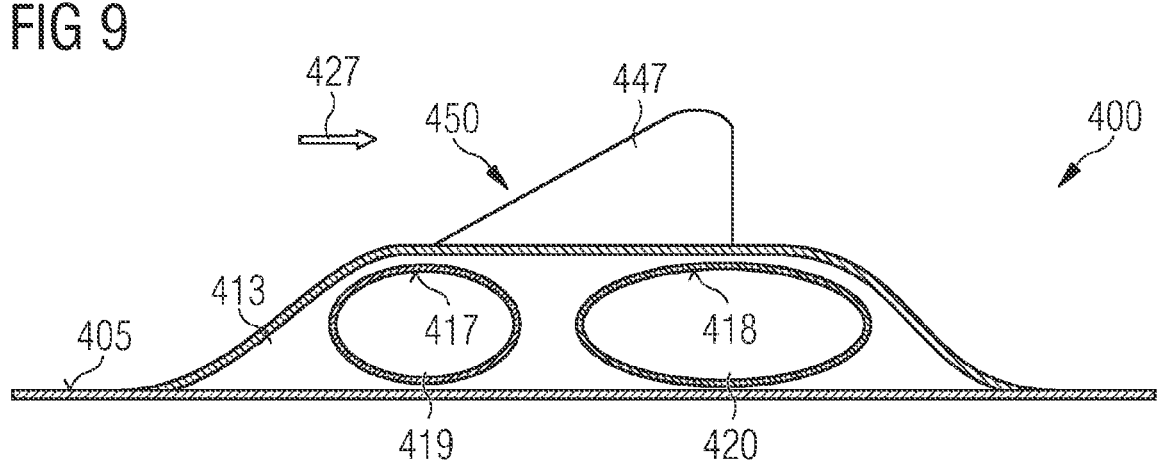
FIG. 9 illustrates the situation in which both, the cavity as well as the further cavity are fully inflated.

FIGS. 7 to 9 schematically illustrate a further embodiment 400 of a rotor blade including an adaptable spoiler 450 additionally providing vortex generating capability. The adaptable spoiler 450 is illustrated in FIGS. 7, 8 and 9 in different states. The spoiler 450 comprises, besides the cavity 419 limited by the internal surface 417 of a body 413, a further internal surface 418 limiting a further cavity 420 to be inflated with fluid to a different level for further adapting the spoiler 450 to different aerodynamic properties. As can be seen from FIGS. 7 to 9, the further internal surface 418 is arranged within the body 413 in a flow direction 427 downstream the internal surface 417.

The adaptable spoiler 450 further comprises a vortex generator 447 which is formed at the body 413, in particular made from a rigid material and is to be exposed to the air flow 427. Upon inflating the cavity 419 and/or the further cavity 420 to a different degree, the aerodynamic properties of the vortex generator 447 change.

FIG. 7 illustrates a situation in which the cavity 419 as well as the further cavity 420 are fully deflated such that the vortex generator 447 is entirely exposed to the air flow 427. FIG. 8 illustrates the situation in which the cavity 419 is fully inflated, while the further cavity 420 is fully deflated. In this situation, the vortex generator 447 is almost completely in a wind shadow along the flow direction 427 generated by the inflated cavity 419 causing the outer surface 415 of the body 413 to significantly protrude upwards, such that the vortex generator 447 is essentially in a wind shadow behind the outer surface 415. FIG. 9 illustrates the situation in which both, the cavity as well as the further cavity 420 are fully inflated. In this situation, the vortex generator 447 again is fully exposed to the air flow 427.

Briefly, FIG. 1 shows a single extruded flexible element; FIGS. 2 and 3 illustrate continuous extruded flexible element with a co-extruded stiff plate for air deflection; FIGS. 4 to 6 illustrate a double piece one continuous extruded flexible section including spoiler, one stiff piece for mechanical connection to blade in particular having a length of 30-50 cm each; FIGS. 7 to 9 illustrate a continuous extruded flexible element with multiple chambers to attain different spoiler configurations.

The continuous flexible element (also referred to as flexible body) may for example be extruded based on materials such as silicone, TPE, TPU, or similar. The stiff element (for example stiff element 229 illustrated in FIGS. 2, 3 or connection structure 333 illustrated in FIGS. 4 to 6) may be co-extruded with compatible polymer combination, for example a TPE-PP combinations. Stiff elements may be segmented into single pieces of for example 30-50 cm of length. Flexible elements may cover the total extension of the spoiler section.

Any stiff element may comprise a composite comprising: a fibre material and thermoplastic and/or thermosetting material, the fibre material in particular comprising at least one of: glass fibre and/or carbon fibre and/or Kevlar and/or natural fibre, the thermosetting material in particular comprising at least one of: epoxy, polyester, vinyl ester, resins. The thermoplastic materials comprising at least one of: PP, SAN, ASA, POM, PVC, PE, or any other common thermoplastic material. Any stiff element can comprise also a combination of thermoplastic and fiber reinforced thermoset materials, or fiber reinforced thermoplastics and thermoplastics, or combinations of fiber-reinforced thermoplastics and elastomers, or any other suitable combination thereof.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. An adaptable spoiler for a wind turbine blade, comprising:
    a body including an outer surface to be exposed to air flow and an internal surface limiting a cavity to be inflated with fluid to different level, wherein a shape and/or position and/or orientation of the surface to be exposed to air flow changes upon inflating the cavity to a different level; and
    a connection structure configured to be connected to a rotor blade surface;
    wherein the body is coupled to the connection structure, wherein the connection structure comprises an upper engagement portion and a lower engagement portion forming a slit in between, wherein the body comprises an engageable portion configured to be engaged by the upper and lower engagement portions of the connection structure by inserting into the slit and latching within the slit by at least one notch mating with at least one protruding element.

2. The adaptable spoiler according to claim 1, wherein the outer surface and the internal surface of the body are arranged at least partially downstream of the engageable portion.

3. The adaptable spoiler according to claim 1, further comprising at least one stiff element having a surface to be air flow exposed, wherein the stiff element is attached to the body such that a protrusion height and/or tilt angle of the surface of the stiff element changes upon inflating the cavity to the different level.

4. The adaptable spoiler according to claim 1, wherein the outer surface to be exposed to air flow is at least in part airfoil shaped.

5. The adaptable spoiler according to claim 1, wherein the body extends along a longitudinal direction of the rotor blade surface over an entire longitudinal extent of the spoiler, is continuous and integrally formed.

6. The adaptable spoiler according to claim 1, wherein the body comprises natural rubber, thermoplastic elastomers, silicone, or a combination thereof.

7. The adaptable spoiler according to claim 1, further comprising:
    a hydraulic and/or pneumatic apparatus arranged and configured to inflate or deflate the cavity and/or a further cavity to different level.

8. The adaptable spoiler according to claim 1, wherein the adaptable spoiler is installed at a blade airfoil surface of the wind turbine blade.

9. The adaptable spoiler according to claim 8, further comprising:
    a flow regulating device installed at the blade airfoil surface downstream from the adaptable spoiler, wherein depending on a state of the adaptable spoiler, an effect of the flow regulating device on air flow is changed.

10. The adaptable spoiler according to claim 8, wherein the adaptable spoiler is installed at the blade airfoil surface, in a front portion of a suction surface.

* * * * *